(12) United States Patent
Lewi

(10) Patent No.: US 8,504,499 B2
(45) Date of Patent: Aug. 6, 2013

(54) CONSTANT MEMORY IMPLEMENTATION OF A PHASE-MODEL NEURAL NETWORK

(75) Inventor: Jeremy M. Lewi, La Jolla, CA (US)

(73) Assignee: The Intellisis Corporation, San Diego, CA (US)

( * ) Notice: Subject to any disclaimer, the term of this patent is extended or adjusted under 35 U.S.C. 154(b) by 508 days.

(21) Appl. No.: 12/836,839

(22) Filed: Jul. 15, 2010

(65) Prior Publication Data

US 2011/0016068 A1    Jan. 20, 2011

Related U.S. Application Data

(60) Provisional application No. 61/225,748, filed on Jul. 15, 2009, provisional application No. 61/329,739, filed on Apr. 30, 2010.

(51) Int. Cl.
| | |
|---|---|
| *G06E 1/00* | (2006.01) |
| *G06E 3/00* | (2006.01) |
| *G06F 15/18* | (2006.01) |
| *G06G 7/00* | (2006.01) |
| *G06N 3/02* | (2006.01) |

(52) U.S. Cl.
USPC .......................................................... 706/15

(58) Field of Classification Search
None
See application file for complete search history.

(56) References Cited

U.S. PATENT DOCUMENTS

2008/0059540 A1*  3/2008  Brown et al. ................. 707/204

OTHER PUBLICATIONS

Seth et al. "Visual Binding Through Reentrant Connectivity and Dynamic Synchronization in a Brain-based Device", Cerebral Cortex V 14 N 11, 2004, pp. 15.*
Lengyel et al. "Uncertainty, phase and oscillatory hippocampal recall", Advances in Neural Information Proc., 2007, pp. 8.*
International Search Report for International Application No. PCT/US2010/042160, International Filing Date: Jul. 15, 2010, 5 pages.

* cited by examiner

*Primary Examiner* — Li-Wu Chang
(74) *Attorney, Agent, or Firm* — Pillsbury Winthrop Shaw Pittman LLP

(57) ABSTRACT

Disclosed are systems, apparatuses, and methods for implementing a phase-model neural network using a fixed amount of memory. Such a phase-model neural network includes a plurality of neurons, wherein each neuron is associated with two parameters—an activity and a phase. Example methods include (i) generating a sequence of variables associated with a probability distribution of phases and (ii) sequentially sampling the probability distribution of phases using a fixed amount of memory, regardless of a number of phases used in the phase-model neural network.

1 Claim, 9 Drawing Sheets

CONSTANT MEMORY IMPLEMENTATION OF A PHASE-MODEL NEURAL NETWORK

CROSS-REFERENCE TO RELATED APPLICATIONS

This application claims benefit under 35 U.S.C. §119(e) to U.S. Provisional Application No. 61/225,748 to Lewi, entitled "Constant Memory Implementation of a Network of Phase Models of Neurons," filed Jul. 15, 2009, and to U.S. Provisional Application No. 61/329,739 to Lewi, entitled "Constant Memory Implementation of a Phase-Model Neural Network," filed Apr. 30, 2010, which are incorporated by reference herein in their entireties.

BACKGROUND OF THE INVENTION

1. Field of the Invention

The present invention is generally directed to neural networks. More particularly, the present invention is directed to hardware implementations of neural networks.

2. Background Art

Neural networks attempt to achieve autonomous behavior—i.e., learn—based on a network of simulated neurons that are connected in a manner suggestive of connections between real neurons in humans. In humans, a first neuron may fire in response to an external stimulus. In response to the firing of the first neuron, other neurons connected to the first neuron may also fire.

Similarly, a first simulated neuron in an input layer of a neural network can become active (e.g., fire) in response to stimulus to the neural network. One or more simulated neurons connected to the first simulated neuron may become active (e.g., fire) in response to the activity (e.g., firing) of the first neuron. Whether the activity of the first simulated neuron causes other simulated neurons to become active is dependent on at least two factors: (i) a weighting function associated with a connection between the first simulated neuron and each other simulated neuron to which the first simulated neuron is connected; and (ii) the threshold activity level required to cause each other simulated neuron to become active.

In a phase-model neural network, each neuron is associated with not only an activity, but also a phase. A phase-model neural network typically includes an integer number of phases (e.g., 32 phases). At each time step of a neural simulation, the phase of a neuron is updated based on a probability distribution of phases.

An undesirable property of conventional implementations of phase-model neural networks is that the amount of memory needed to store the probability distribution of phases is proportional to the integer number of phases included in the model. This property is undesirable for several reasons. For example, in conventional phase-model neural networks, the only way to make the number of phases large is to dedicate a large percentage of hardware resources to storing the probability distribution of phases. As another example, in most dedicated hardware platforms, it is difficult to create an adjustable amount of memory to accommodate an adjustable number of phases used in a phase-model neural network.

Given the foregoing, what is desired are systems, apparatuses, and methods for implementing a phase-model neural network using a fixed amount of memory, regardless of the number of phases used in the phase-model neural network.

BRIEF SUMMARY OF EMBODIMENTS OF THE INVENTION

The present invention meets the above-described needs by providing system, apparatus, articles of manufacture, and method embodiments for implementing a phase-model neural network using a fixed amount of memory, regardless of the number of phases used in the phase-model neural network. Such a phase-model neural network includes a plurality of neurons, wherein each neuron is associated with two parameters—an activity and a phase.

According to an embodiment of the present invention, a method includes (i) generating a sequence of variables associated with a probability distribution of phases and (ii) sequentially sampling the probability distribution of phases using a fixed amount of memory.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 2:
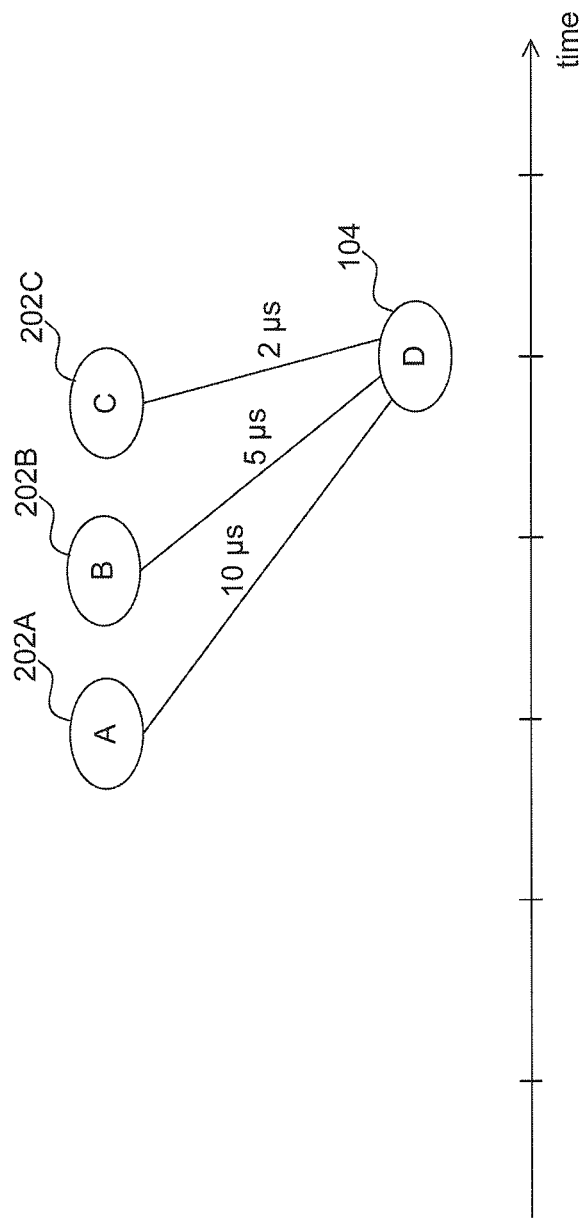
FIG. 2 illustrates example travel times of neural signals from pre-neurons to a post-neuron.
Figure 3A:
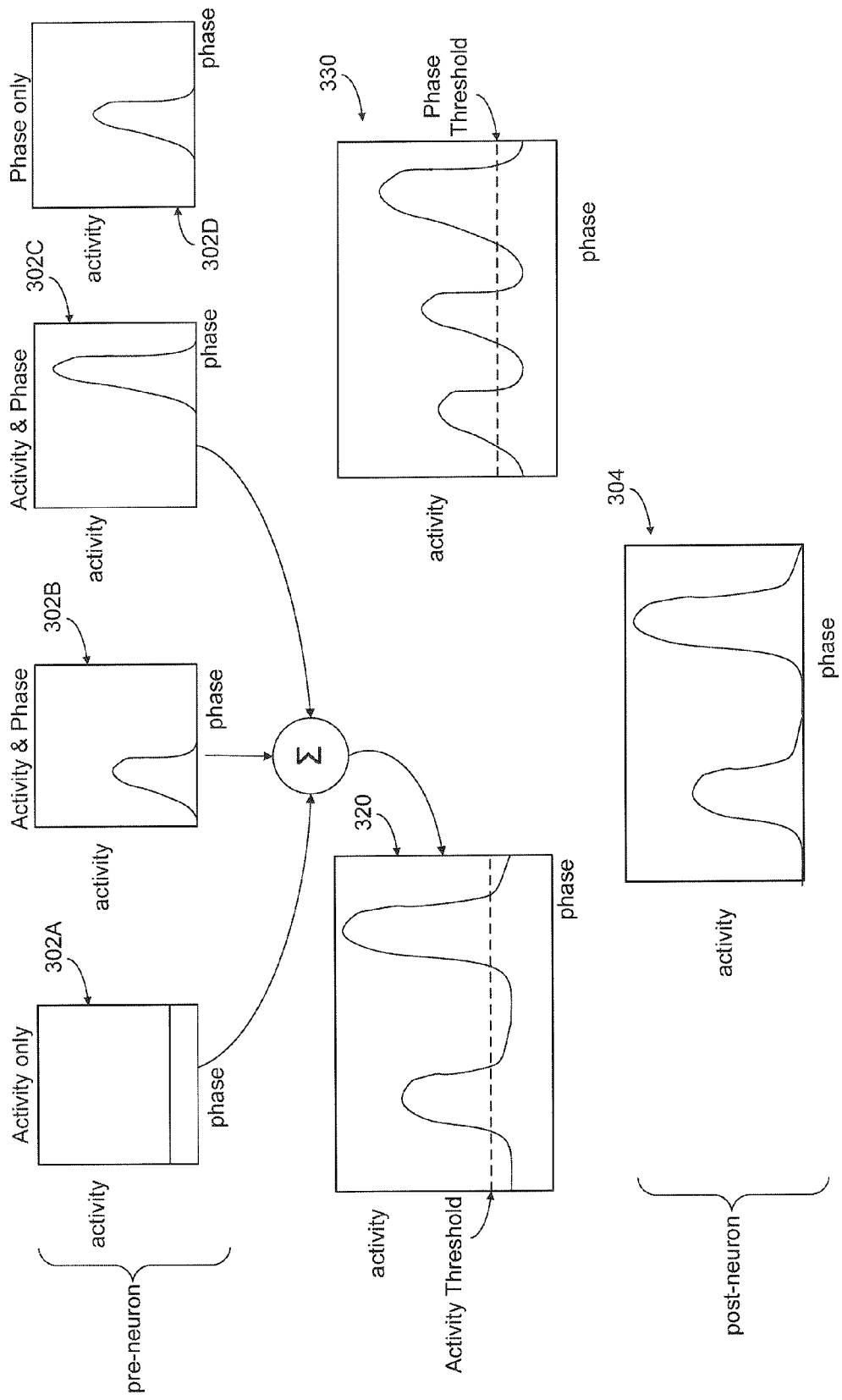
Figure 3B:
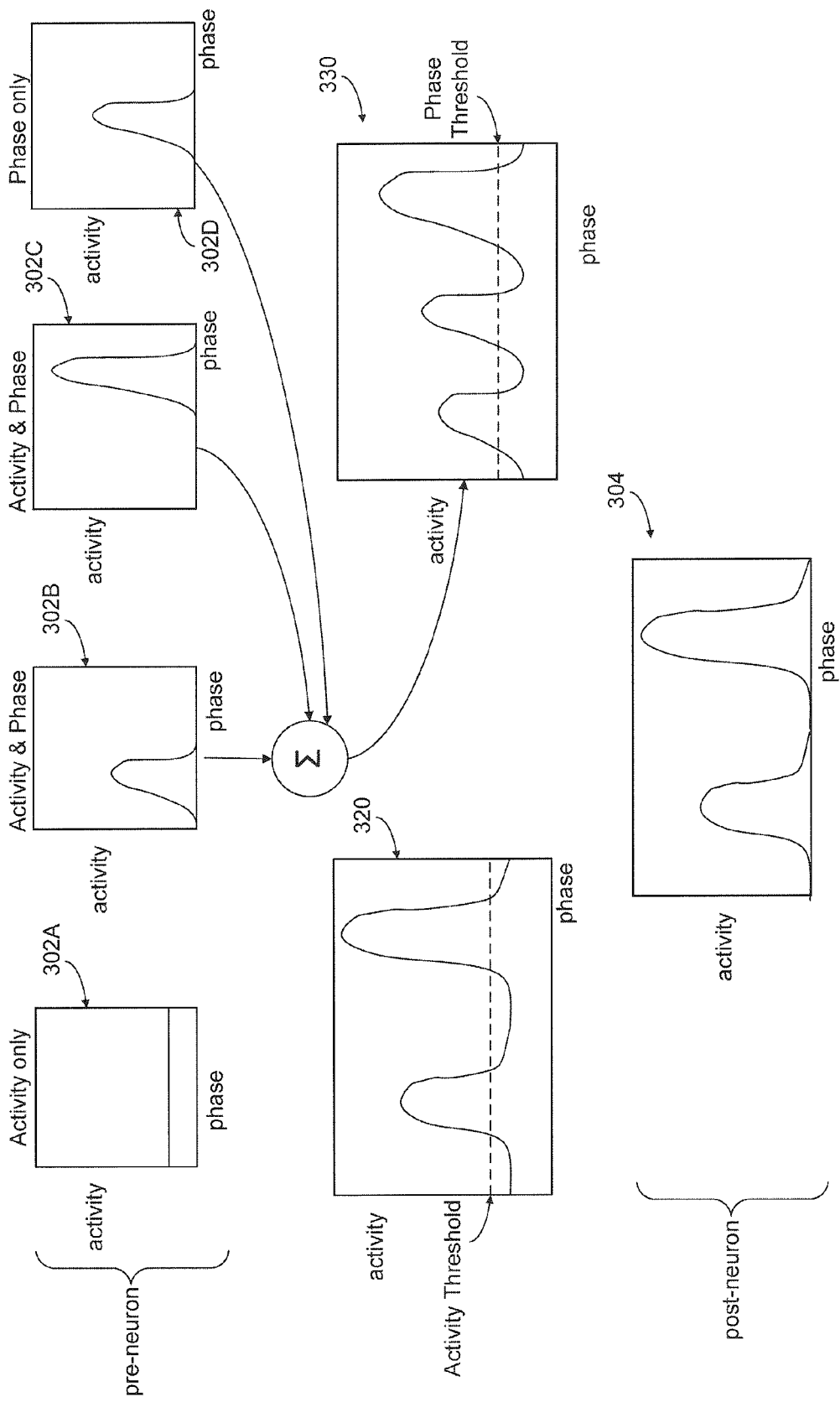
Figure 3C:
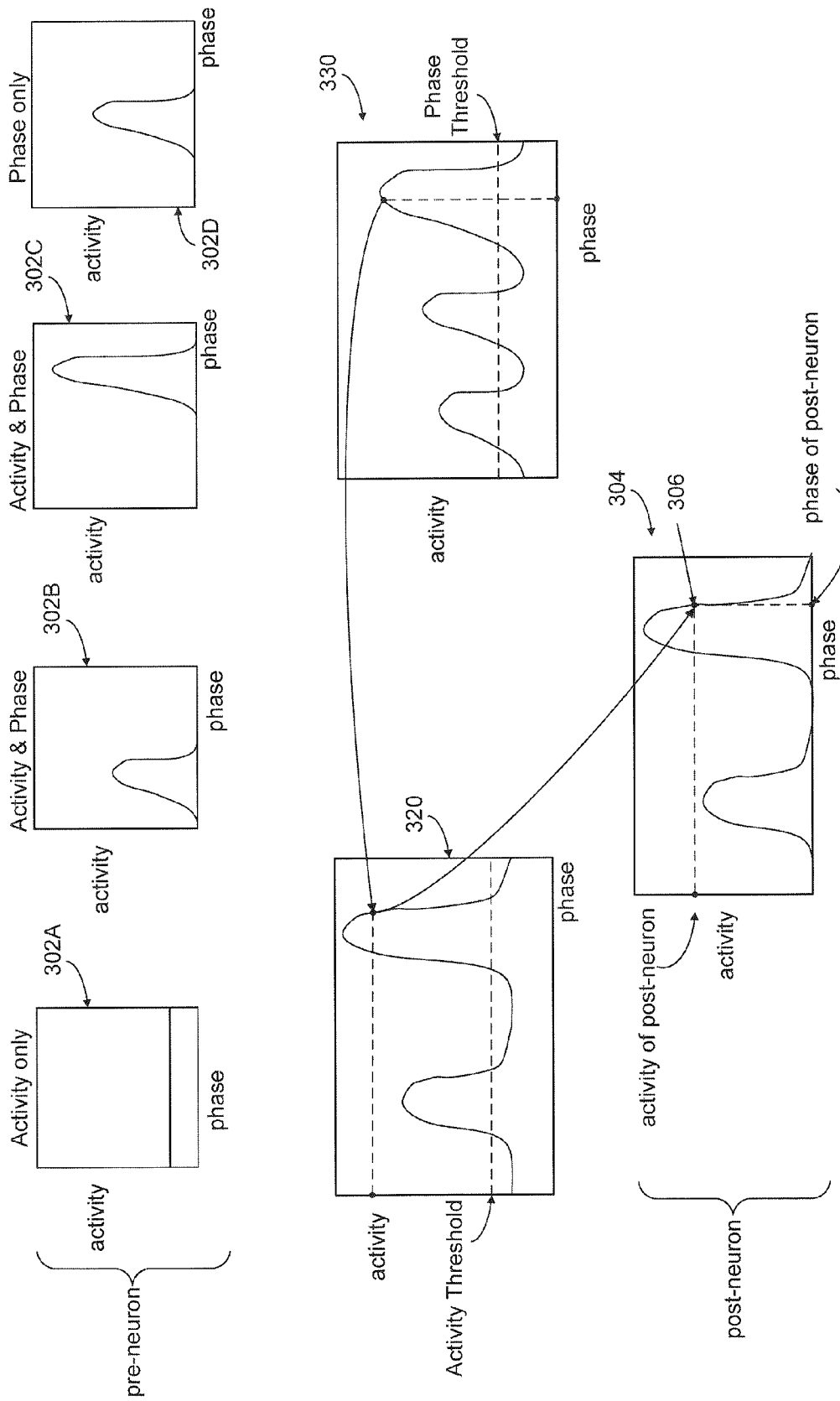

FIG. 3A-C graphically illustrate an example of how the activity and phase of pre-neurons of FIG. 2 are used to set the activity and phase of the post-neuron of FIG. 2.

Figure 4:
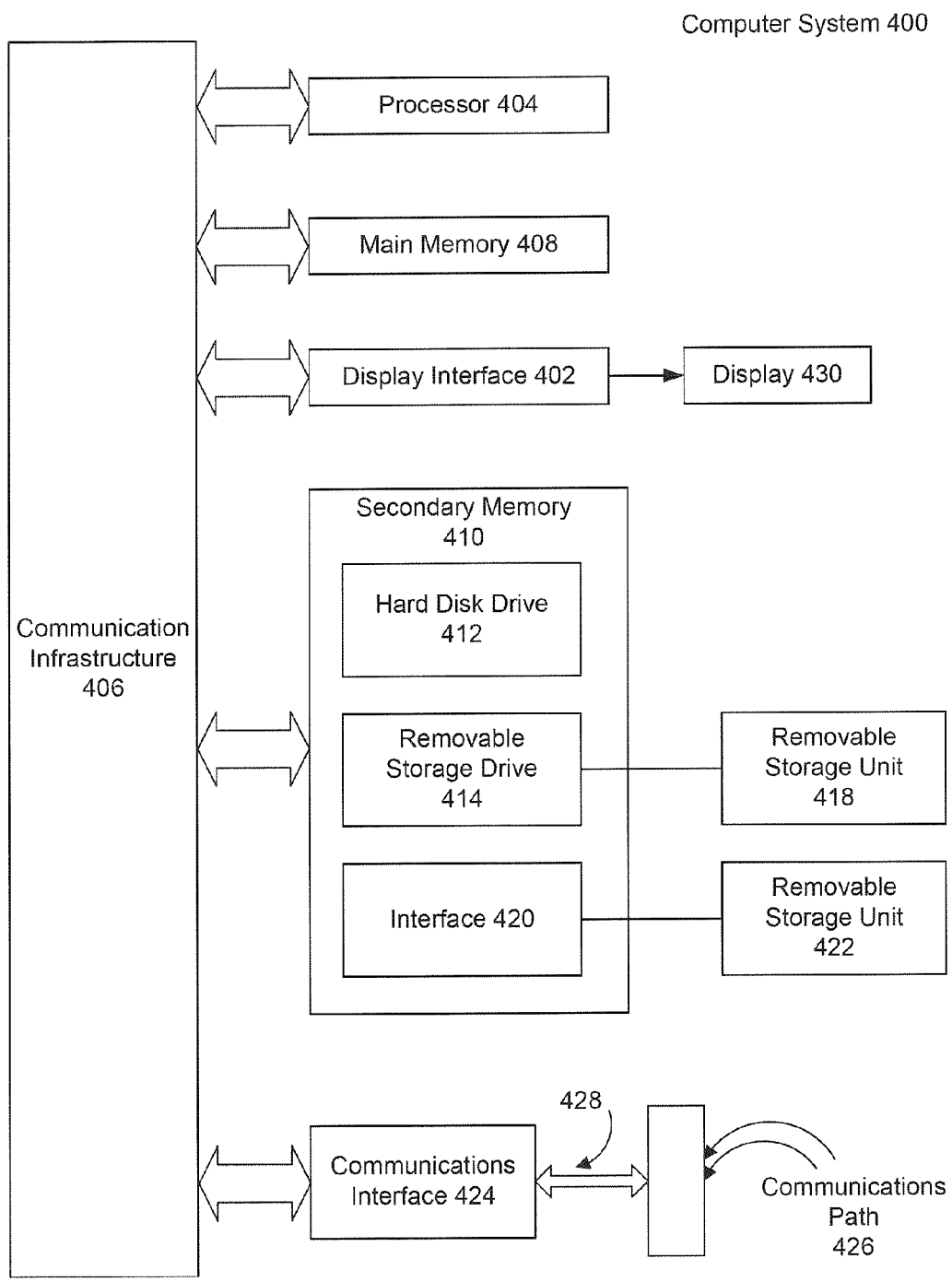

FIG. 4 illustrates an example computer system in accordance with an embodiment of the present invention.

Figure 5:
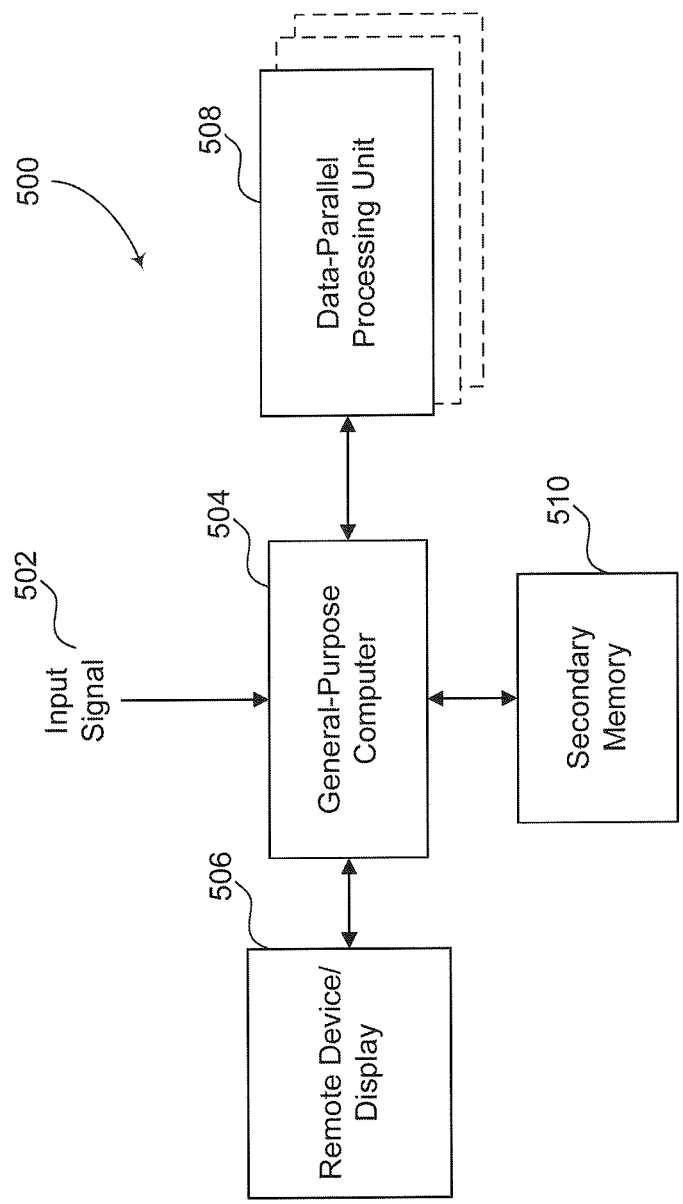

FIG. 5 illustrates a more-detailed example computer system for implementing a neural simulation in accordance with an embodiment of the present invention.

Figure 6:
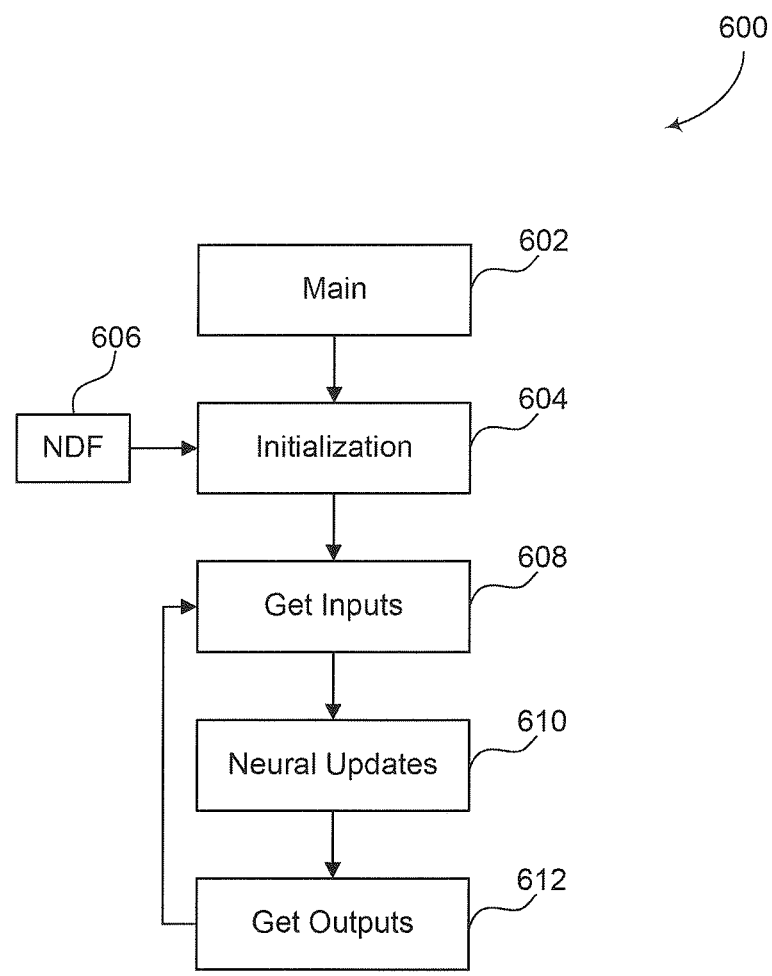

FIG. 6 illustrates an example process for implementing a neural simulation in accordance with an embodiment of the present invention.

Figure 7:
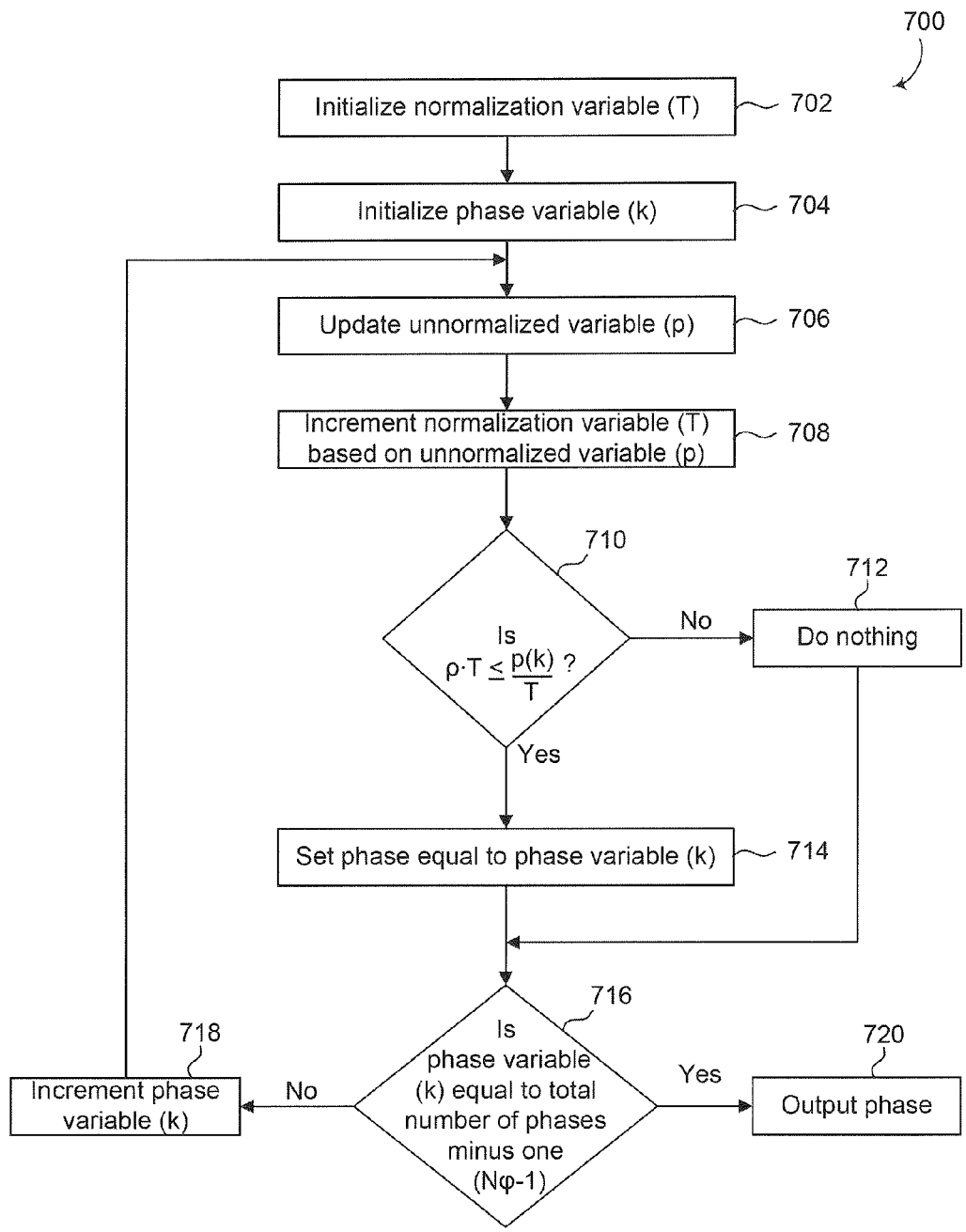

FIG. 7 illustrates an example fixed-memory implementation for updating a phase of a neuron in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Overview of Embodiments of the Invention

Embodiments of the present invention include constant memory implementations of phase-model neural networks, and applications thereof. As used herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

An embodiment of the present invention provides a unique, constant-memory implementation of a phase-model neural network. According to this embodiment, a fixed amount of memory is used to sample and update a phase of each neuron in a neural network. In contrast, conventional methods for sampling and updating the phase of the neurons requires an amount of memory which increases linearly with the number of phases implemented in the model. Because methods of embodiments of the present invention do not increase linearly with the number of phases, the methods of embodiments of the present invention are better suited to platforms where the amount of memory is fixed. For example, the methods of embodiments of the present invention are better suited for implementation in dedicated hardware—e.g., a field-programmable gate array (FPGA) or an application-specific integrated circuit (ASIC).

Before providing details of a constant-memory implementation for sampling and updating a phase of a neuron in accordance with embodiments of the present invention, it is first helpful to disclose concepts underlying neural networks.

II. Neural Networks

A. Basic Concepts of Neural Networks

A neural network comprises a set of discrete elements—neurons—that are connected to one another. Each neuron is typically connected to a fraction of all the neurons in the network. Associated with each neuron and connection is a set of states and parameters which are potentially changing with time.

Figure 1:
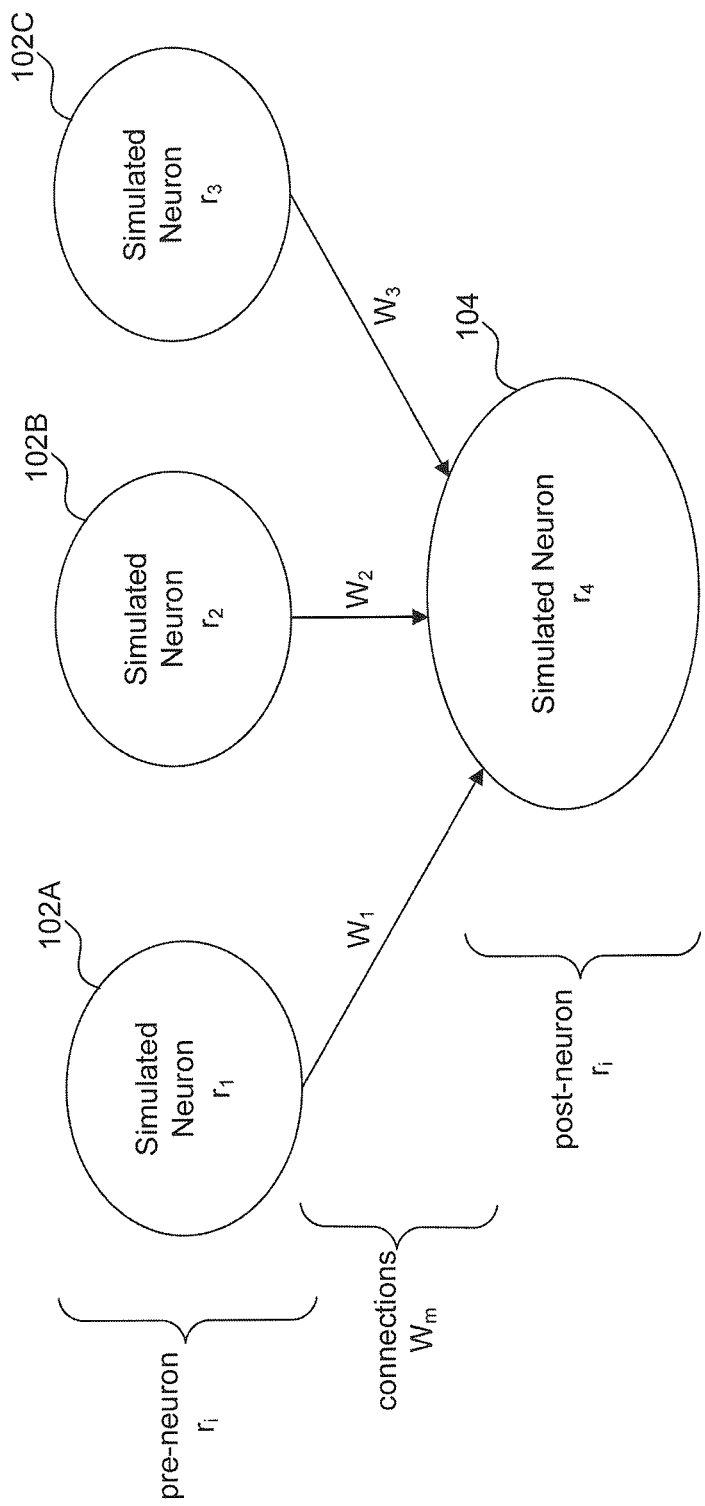
FIG. 1 illustrates an example neural anatomy in which three pre-neurons are connected to one post-neuron.

FIG. 1 illustrates a very simple example of a neural network. In the example of FIG. 1, three neurons 102A-C (referred to as pre-neurons) are connected to one neuron 104 (referred to as a post-neuron). Mathematically, the set of states and parameters for each pre-neuron 102 and post-neuron 104 is described by a vector, $\vec{r}_j$, where the subscript identifies the particular neuron. For the example of FIG. 1, the index j runs from 1 to 4 because there are four neurons—i.e., three pre-neurons 102 and one post-neuron 104.

Similarly, each connection is described by a vector $\vec{w}_k$, where the subscript k identifies the connection. For the example of FIG. 1, the index k runs from 1 to 3 because there are three distinct connections—i.e., one connection from pre-neuron 102A to post-neuron 104, one connection from pre-neuron 102B to post-neuron 104, and one connection from pre-neuron 102C to post-neuron 104. In a neural network, each connection is directed. This means, for each connection, one neuron is designated as the start of the connection and the other neuron is the terminal for the connection. The start neuron for a given connection is called a pre-synaptic neuron (or pre-neuron) and the terminal for a given connection is called the post-synaptic neuron (or post-neuron).

A neural network is therefore defined by the following data:

$$R = \{\vec{r}_j : j \in 1, 2, \ldots, N_r\} \quad \text{(Eq. 1.a)}$$

$$W = \{\vec{w}_m : m \in 1, 2, \ldots, N_w\} \quad \text{(Eq. 1.b)}$$

$$C = \{(l, m, k) : m \in 1, 2, \ldots, N_w\} \quad \text{(Eq. 1.c)}$$

Here $N_r$ is the number of neurons in the network, and $N_w$ is the number of connections. R is the set of state vectors describing the neurons. W is the set of state vectors describing the connections. C is a set of ordered triplets. Each of these triplets describes one connection in the network. The first value in this triplet, l, specifies the index of the pre-synaptic neuron. The second value, m, is the index of the post-synaptic neuron. The third value, k, is an index which identifies the connection, i.e., k has a unique value for each ordered triplet (l, m, k). Each of these indexes corresponds to a state vector $\vec{r}_l$, $\vec{r}_m$, $\vec{w}_k$ which contains the states and parameters of the pre-synaptic, post-synaptic, and connection, respectively.

A neural network operates by iteratively updating the state vectors for the neurons and connections. Each iteration is referred to as an epoch or time step. At each time step, the state vector for each neuron j is updated by evaluating a function, $f_j$ for that neuron. After updating all neurons, each connection m is updated by evaluating a function $r_m$. Input is provided to the network by allowing the function $f_j$ for some neurons to depend on an input signal $\vec{I}$. Importantly, the connections determine which neurons directly influence the state vectors of other neurons. Furthermore, this interaction is modulated by the state values of that connection, $\vec{w}_m$. This is described in more detail below.

At each time step, the state vector for neuron j is updated by executing a function $f_j$. The output of this function is the new value for the neuron's state vector, $\vec{r}_j$. The function $f_j$ depends on the current value of the state vector $\vec{r}_j$ as well as all connections (and the associated pre-synaptic neuron) for which neuron j is the post-synaptic neuron. The update for neuron j can be written as $$\vec{r}_j \leftarrow f_j(\vec{r}_j, C_j) \quad \text{(Eq. 2)}$$

where $C_j = \{(\vec{r}_l, \vec{w}_m) : \text{for all m, such that } (l, j, m) \in C\}$.

The set $C_j$ denotes the set of all pairs of pre-synaptic state vectors $\vec{r}_l$ and connection state vectors $\vec{w}_m$ for which there exists a connection from neuron l to neuron j. The left-pointing arrow in Equation 2 means that the value of $\vec{r}_j$ is replaced with the result of evaluating $f_j$.

The function $f_j$ can be any function that satisfies the following constraints. For each connection, the function $f_j$ can only depend on intermediary values, $\vec{a}_m$, which are a function only of $(\vec{r}_l, \vec{r}_j, \vec{r}_m)$ for connection m. Furthermore, it must be possible to serially accumulate the contributions to $\vec{r}_j$ from all connections using a fixed amount of memory which is independent of the number of connections. The following pseudo code for $f_j$ illustrates these criteria:

```
Function f_j
    For (r⃗_l, w⃗_m) ∈ C_j
        a⃗_j ← h_m(r⃗_l, r⃗_j, w⃗_m)
        b⃗_j ← g_j(a⃗_j, b⃗_j)
    Return k_j(r⃗_j, b⃗_j)
```

Here $h_m$, $g_j$, and $k_j$ are vector-valued functions that return vectors. The vector, $\vec{a}_j$, is the contribution to neuron j from connection m and pre-synaptic neuron l. The vector, $\vec{b}_j$, quantifies the total effect of all contributions. The only restriction on $f_j$ is that it must be able to compute the effect of all contributions to neuron j by processing each connection one by one. After processing each connection, $\vec{b}_j$ is updated and this vector is sufficient to describe the contributions of all connections processed so far. The for loop therefore accumulates the contributions of all connections. After iterating over all connections which terminate on neuron j, the new value for $\vec{r}_j$ is computed by evaluating function $k_j$. The function $k_j$ depends on the current state of the neuron, specified by $\vec{r}_j$, and the combined effect of all connections to neuron j as measured by $\vec{b}_j$. The main point is that the amount of memory needed to implement $f_j$ is independent of the number of connections.

In the pseudo code for $f_j$ no order for processing the connections is given. However, for some functions/connections the connections might be processed in a specific order.

A fundamental feature of neural networks is that they can learn and adapt. Mathematically, this means the states and parameters of the neurons and connections can change with time as a function of the input and their dynamics. For the neuron learning means choosing appropriate functions $h_m$, $g_j$, and $k_j$. For connections, learning means letting the state vector $\vec{w}_m$ change with time. In particular, at each time step each connection is updated as $$\vec{w}_m \leftarrow \psi_m(\vec{w}_m, \vec{r}_i, \vec{r}_j)$$

Here $\psi_m$ is a function that determines how the connection changes. The only restriction on $\psi_m$ is that it is a function of the connection, $\vec{w}_m$ and the pre and post-synaptic neurons ($\vec{r}_i$, $\vec{r}_m$). A connection may also be updated based on a third parameter, called a value signal. In general, a value signal is a non-local signal—e.g., typically one signal affects many connections.

In the description of a neural network above, each neuron and connection has a unique set of functions to describe its evolution. In practice, most networks contain a few types of connections and neurons. Each type of neuron or connection is associated with a particular function $f$ for the neuron type or $\psi$ for the connection.

Applying a neural network to a problem such as classifying images, entails choosing suitable quantities to encode in the state vectors ($\vec{w}_m$, $\vec{r}_i$, $\vec{r}_j$) as well as the appropriate functions $f_j$, $\vec{h}_m$, $\vec{g}_j$, $\psi_m$, for updating these quantities.

Neural networks provide a general framework in which a multitude of algorithms may be chosen, depending on the choice of functions and the quantities encoded in the state vectors. The functions may not even be deterministic. As illustrated below, any of the functions, such as $f$, might entail sampling some probability distribution which depends on the pre-synaptic neurons.

One approach to applying neural networks is to gain insight from the actual neural networks found in biology. This approach is based on choosing functions and state vectors that model the function and behavior of neural networks found in biology.

The set of biologically inspired functions range from detailed, biophysical models of neurons (see, e.g., A. L. Hodgkin and A. F. Huxley, "A quantitative description of membrane current and its application to conduction and excitation in nerve," *J Physiol*, 117(4):500-544, August 1952 ("Hodgkin"); E. M. Izhikevich, "Simple model of spiking neurons," *IEEE Trans Neural Netw*, 14(6):1569-1572, 2003 ("Izhikevich"), wherein Hodgkin and Izhikevich are each hereby incorporated by reference in their entirety) to more-simple, abstract models of neurons (see, e.g., Jeffrey L. Krichmar and Gerald M. Edelman, "Machine Psychology: Autonomous Behavior, Perceptual Categorization and Conditioning in a Brain-based Device," *Cereb. Cortex*, 12(8):818-830, 2002 ("Krichmar et al."); Jeffrey L. McKinstry, Gerald M. Edelman, and Jeffrey L. Krichmar, "A cerebellar model for predictive motor control tested in a brain-based device," *Proceedings of the National Academy of Sciences of the United States of America*, 103(9):3387-3392, 2006 ("McKinstry et al."), wherein Krichmar et al. and McKinstry et al. are each hereby incorporated by reference in their entirety). The potential advantage of complicated biophysical models of spiking neurons is they can potentially allow the network to perform a wider range of sophisticated algorithms. The trade-off, however, is that detailed biophysical models are expensive computationally and thus typically take longer to deliver an answer. Consequently, researchers typically try to use the simplest model possible for their application.

In neuroscience, the output of a neuron is typically understood to be its spike train. The spike train is a time series of ones and zeroes. Mathematically, this means that one component of the vector $\vec{r}_j$ is designated as the output and treated as a discrete variable, which can take on a value of 1 or 0.

An open-ended question in neuroscience is how information is actually encoded in the ones and zeroes. In particular, there is much debate as to whether the precise timing of the spikes (the ones) encodes information or whether information is primarily encoded in the average number of spikes in some time window. These coding schemes are typically referred to as spike-time and mean firing-rate codes, respectively.

Despite evidence suggesting the importance of spike timing in encoding information, researchers and engineers often use mean firing-rate models because spike-timing models require too much time to compute the updated outputs of each neuron at each time step—i.e., most spike-timing models use functions $f_j$ which are computationally very expensive. As a result, several researchers have modified the mean firing-rate model to allow the relative timing of spikes in different neurons to be encoded in an approximate fashion, without requiring models that are expensive to simulate.

For example, FIG. 2 illustrates principals of a spike-time model. In FIG. 2, a post-neuron 204 is connected to three different pre-neurons—a first pre-neuron 202A, a second pre-neuron 202B, and a third pre-neuron 202C. In an animal, post-neuron 204 may be trained to fire only if the signal from each pre-neuron 202 arrives at post-neuron 204 at the same time. However, in the example of FIG. 2, due to the relative positioning of pre-neurons 202 with respect to post-neuron 204, the firing of first pre-neuron 202A may take approximately 10 µs to reach post-neuron 204, the firing of second pre-neuron 202B may take approximately 5 µs to reach post-neuron 204, and the firing of third pre-neuron 202C may take approximately 2 µs to reach post-neuron 204.

To accurately model the firing of post-neuron 204 based on the simultaneous receipt of signals from pre-neurons 202, simulated neurons would need to have accuracy on the microsecond time scale. Although spike-timing models of simulated neurons attempt to accurately resolve the receipt of signals on the microsecond time scale, such short time-scale accuracies are difficult to achieve with modern computing equipment. To circumvent this computing difficulty, a mean firing-rate model can be used. In a mean firing-rate model, in an embodiment each simulated neuron roughly corresponds to approximately 100 real neurons, and the relative timing of when real neurons fire is roughly modeled by a single parameter: the phase of a simulated neuron. A mean firing-rate model does not require microsecond time-scale accuracy.

Embodiments of the present invention are described herein in terms of a mean firing-rate model, although the invention is not limited to this example.

B. Phase Model

Recently, a neural model called the phase model was proposed. (See Anil K. Seth, Jeffrey L. McKinstry, Gerald M. Edelman, and Jeffrey L. Krichmar, "Visual Binding Through Reentrant Connectivity and Dynamic Synchronization in a Brain-based Device," *Cereb. Cortex,* 14(11):1185-1199, 2004 ("Seth et al."), which is hereby incorporated by reference in its entirety.) This model has the advantage of being able to approximately encode the relative timing of spikes in different neurons without requiring significantly more computation than the basic mean firing-rate model. In this model, the output of each neuron, $\vec{r}_j$, is represented by an ordered pair $(A_j, \phi_j)$. In this $A_j$ model roughly corresponds to the number of spikes in some time window and $\phi_j$ is the phase of the neuron. This model implicitly views the firing rate of the neuron as being a time-varying function. $A_j$ encodes the amplitude of this function, while $\phi_j$ encodes the relative timing between the peaks in the firing rate of different neurons. In this model, $\phi_j$ is an integer between 0 and $N_\phi - 1$. The parameter $N_\phi$, can be adjusted for different networks. Increasing $N_\phi$ allows the relative timing to be measured with greater precision, but is more expensive to simulate.

The phase model has proved useful for solving a problem in signal processing known as the binding problem. The binding problem refers to a situation when two or more objects detected in an input belong to the same object. For example, suppose a signal-processing system is processing an image of a square table that has square legs. In this case, a first level of processing might include a square detector that detects the squares corresponding to the table's four legs and the table's surface. Solving the binding problem entails realizing that these five squares correspond to the same object, rather than from five distinct objects. The phase of a neuron can be used to 1) decide when two detected objects are part of a larger object and 2) encode the fact that two objects are part of the larger object. (See, e.g., U.S. application Ser. No. 12/621,243, entitled "Neural Segmentation of an Input Signal and Applications Thereof," to Moore et al., and filed Nov. 18, 2009, the entirety of which is hereby incorporated by reference herein.)

In the phase model, the phase of a neuron is generated randomly. In particular, the function $f_j$ generates the new phase by sampling a probability distribution that gives a probability that the new phase has one of the possible values $0, \ldots, N_\phi - 1$. The shape of this probability distribution depends on the activities and phases of the pre and post synaptic neurons, as well as the connection state vectors, $\vec{w}_j$, as illustrated, for example, with reference to FIGS. 3A-C. For some functions $f_j$, the new phase may be used to compute the new value of $A_j$, but this need not be the case. One reason generating the phase randomly is important is that it increases the representational power of the network. In particular, even if the inputs to two neurons are the same, the neurons will end up generating different outputs. One example where this behavior is particularly useful is demultiplexing a signal.

FIG. 3A illustrates an example manner for generating the activity and phase of a post-neuron (like simulated neuron 204) based on the activity and phase of pre-neurons (like simulated neurons 202) to which the post-neuron is connected. Referring to FIG. 3A, a first graph 302A represents the activity and phase of first simulated neuron 202A; a second graph 302B represents the activity and phase of second simulated neuron 202B; and a third graph 302C represents the activity and phase of third simulated neuron 202C. Fourth graph 302D represents a phase-only contribution that may come from a pre-neuron not illustrated in FIG. 2. The uniform distribution of first graph 302A is for a phase-independent input, and the distributions of graphs 302B and 302C are for phase-dependent inputs.

Graphs 302A, 302B, and 302C provide activity-effecting contributions to post-neuron 204. Graphs 302B, 302C, and 302D provide phase-effecting contributions to post-neuron 204. These concepts are described in greater detail below.

Determining the activity and phase of post-neuron 204, based on the activity-effecting contributions of pre-neurons 202, involves several steps. First, the activity-effecting contributions of pre-neurons 202 (e.g., activity-only contribution 302A and activity-and-phase contributions 302B, 302C) are summed together as represented by graph 320. Second, activities below an activity threshold are disregarded, as illustrated in graph 320. These activities are disregarded because only activities above the activity threshold can cause post-neuron 204 to become active.

The state of a simulated neuron (post-neuron) is updated as a function of its current state and contributions from inputs. The inputs may include, but are not limited to, voltage-independent inputs, voltage-dependent inputs, phase-independent inputs, and/or phase-dependent inputs. In an embodiment, voltage-independent inputs always contribute to the activity level provided to a post-neuron; voltage-dependent inputs contribute to the activity level provided to a post-neuron only if the voltage-independent inputs provided to the post-neuron exceed a threshold; and phase-independent inputs influence only the activity of a post-neuron, not the phase of the post-neuron (as illustrated, for example, by graph 302A of FIGS. 3A-C), whereas phase-dependent inputs influence only the phase of a post-neuron, not the activity of the post-neuron (as illustrated, for example, by graph 302D of FIGS. 3A-C). Voltage-independent inputs, voltage-dependent inputs, phase-independent inputs, and phase-dependent inputs are described in more detail below.

1. Voltage-independent Inputs

The voltage-independent input to a simulated neuron i (post-neuron) from a single simulated neuron j (pre-neuron) is given by:

$$A_{ij}^{VI}(t) = c_{ij} s_j(t) \qquad \text{(Eq. 3)}$$

wherein $s_j(t)$ is the activity of simulated neuron j and $c_{ij}$ is the connection strength from simulated neuron j to simulated neuron i. The connection strength, $c_{ij}$, can change over time.

The total voltage-independent influence provided to the simulated neuron i (post-neuron) is then calculated by convolving the value of Equation 3 into a cosine-tuning curve over all phases and summing over the contribution from each simulated neuron j (pre-neuron):

$$POST_i^{VI} = \sum_{l=1}^{M} \sum_{j=1}^{N_l} \left( A_{ij}^{VI}(t) \sum_{k=1}^{N_{bin}} \left( \frac{\cos((2\pi/N_{bin})(k - p_j(t))) + 1}{2} \right)^{tw} \right) \qquad \text{(Eq. 4)}$$

wherein M is the number of different anatomically defined connection types; $N_l$ is the number of connections of type M projecting from simulated neuron j (pre-neuron) to simulated neuron i (post-neuron); $p_j(t)$ is the phase of simulated neuron j at time t; $N_{bin}$ is the number of phase bins (e.g., 32); and tw is the tuning width, which can be adjusted to adjust the width of the cosine-tuning curve (e.g., the width of the curves depicted in graphs 302B and 302C of FIG. 3).

2. Voltage-dependent Inputs

The voltage-dependent input to a simulated neuron i (post-neuron) from a single simulated neuron j (pre-neuron) is given by:

$$A_{ij}^{VD}(t) = \Phi(POST_i^{VI}(p_j(t)))c_{ij}s_j(t) \quad \text{(Eq. 5)}$$

wherein $$\Phi(x) = \begin{cases} 0; & x < \sigma_i^{vdep} \\ x; & \text{otherwise} \end{cases}$$

wherein $\sigma_i^{vdep}$ is a threshold for the activity of a post-neuron below which voltage-dependent connections have no effect.

The total voltage-dependent influence provided to simulated neuron i (post-neuron) is then computed by summing the contribution from each simulated neuron j (pre-neuron) connected to simulated neuron i (post-neuron), as given by:

$$POST_i^{VD} = \sum_{l=1}^{M}\sum_{j=1}^{N_l}\left(A_{ij}^{VD}(t)\sum_{k=1}^{N_{bin}}\left(\frac{\cos((2\pi/N_{bin})(k-p_j(t)))+1}{2}\right)^{tw}\right) \quad \text{(Eq. 6)}$$

wherein, as in Equation 4, M is the number of different anatomically defined connection types; $N_l$ is the number of connections of type M projecting from simulated neuron j (pre-neuron) to simulated neuron i (post-neuron); $p_j(t)$ is the phase of simulated neuron j at time t; $N_{bin}$ is the number of phase bins (e.g., 32); and tw is the tuning width, which can be adjusted to adjust the width of the cosine-tuning curve (e.g., the width of the curves depicted in graphs 302B and 302C of FIG. 3)

3. Phase-independent Inputs

The phase-independent input to a simulated neuron i (post-neuron) from a single simulated neuron j (pre-neuron) is given by:

$$A_{ij}^{PI}(t) = c_{ij}s(t) \quad \text{(Eq. 7)}$$

The total phase-independent influence provided to simulated neuron i (post-neuron) is a uniform distribution based on all phase-independent inputs divided by the number of phase bins, $N_{bin}$:

$$POST_i^{PI} = \sum_{l=1}^{M}\sum_{j=1}^{N_l}(A_{ij}^{PI}(t)) \quad \text{(Eq. 8)}$$

wherein M is the number of different anatomically defined connection types; $N_l$ is the number of connections of type M projecting from simulated neuron j (pre-neuron) to simulated neuron i (post-neuron); and $N_{bin}$ is the number of phase bins (e.g., 32).

4. Phase-dependent Inputs

The phase-dependent input to a simulated neuron i (post-neuron) from a single simulated neuron j (pre-neuron) is given by:

$$A_{ij}^{PD}(t) = c_{ij}s_j(t) \quad \text{(Eq. 9)}$$

The total phase-dependent influence provided to the simulated neuron i (post-neuron) is then calculated by convolving the value of Equation 9 into a cosine-tuning curve over all phases and summing over the contribution from each simulated neuron j (pre-neuron):

$$POST_i^{PD} = \sum_{l=1}^{M}\sum_{j=1}^{N_l}\left(A_{ij}^{PD}(t)\sum_{k=1}^{N_{bin}}\left(\frac{\cos((2\pi/N_{bin})(k-p_j(t)))+1}{2}\right)^{tw}\right) \quad \text{(Eq. 10)}$$

wherein M is the number of different anatomically defined connection types; $N_l$ is the number of connections of type M projecting from simulated neuron j (pre-neuron) to simulated neuron i (post-neuron); $p_j(t)$ is the phase of simulated neuron j at time t; $N_{bin}$ is the number of phase bins (e.g., 32); and tw is the tuning width, which can be adjusted to adjust the width of the cosine-tuning curve (e.g., the width of the curve depicted in graph 302D of FIGS. 3A-C).

\* \* \*

After computing the voltage-independent inputs, the voltage-dependent inputs, the phase-dependent inputs, and the phase-independent inputs, a distribution of possible new phases and new activities for a post-neuron (such as post-neuron 204 of FIG. 2) is mathematically computed by linearly summing the contributions defined in Equations 4, 6, 8, and 10 (which results in a distribution similar to graph 304 of FIG. 3C):

$$POST_i = \sum_{j=1}^{N_{VI}}POST_j^{VI}\sum_{k=1}^{N_{VD}}POST_k^{VD}\sum_{l=1}^{N_{PI}}POST_l^{PI}\sum_{m=1}^{N_{PD}}POST_m^{PD} \quad \text{(Eq. 11)}$$

The new activity and phase of post-neuron i is selected at a point on the distribution (curve) computed in Equation 11, as described in detail above with respect to FIGS. 3A-C.

The new activity level may also be subjected to the following activation function:

$$s_i(t+1) = \phi(\tanh(g_i(POST_i(p_i(t+1)) + \omega_{s_i}(t)))) \quad \text{(Eq. 12)}$$

wherein $$\phi(x) = \begin{cases} 0; & x < \sigma_i^{fire} \\ x; & \text{otherwise} \end{cases}$$

wherein $\omega_{s_i}$ determines the persistence of simulated-neuron activity from one simulation cycle to the next, $g_i$ is a scaling factor, and $\sigma_i^{fire}$ is a firing threshold specific to each simulated neuron.

In general, therefore, computing the phase of a post-neuron includes the following steps. Evaluating $f_j$ entails computing a function p(i) for i=0, 1, ... $N_\phi-1$. The values of this function can be interpreted as an unnormalized probability distribution that the new phase of neuron j will be i. The function p(i) depends on the activities and phases of the neurons which are connected to neuron j.

$$p(i) = pgen_j(i, \vec{r}_p\{afunc(\vec{r}_l, \vec{w}_m):(i,j,m) \in C^l\}) \; i = 0,1,\ldots,N_\phi-1$$

wherein $pgen_j$ is a nonlinear function. To compute the new phase, $\phi_j$, of neuron j, the distribution p(i) is normalized to obtain a valid probability distribution on the integers $i=0, 1, \ldots N_\phi-1$ and then sampled. The normalized distribution is therefore $$P_j(i) = \frac{p_j(i)}{\sum_{k=0}^{N_\phi-1} p_j(i)}$$

Thus, the updated phase is, $$\phi_j \sim P(i)$$

where ~ means that the phase, $\phi_j$, is an instance of the random variable with probability distribution $P(i)$ for $i=0, 1, \ldots N_\phi-1$.

The updated activity of the neuron is then set to $$A_j \leftarrow h_j(A_j, \phi_j, \{afunc(\vec{r}_l, \vec{w}_m):(l,j,)\in C^j\})$$

where $h_j$ is a nonlinear function. Here the function, $h_j$, is a function of the new phase as well as the current activity and pre-synaptic neurons. A neural network, as described above, however, is more general. That is, the function $f$ can be any function. Thus, the new activity $A_j$ need not depend on the new phase $\phi_j$. Furthermore, the new activity could potentially be generated from a random distribution as well. In fact, a large number of algorithms can be viewed as computation on a graph, i.e. a neural network, involving probabilistic computations and random sampling.

To facilitate the use of neural networks in real-world applications, a number of researchers have started developing custom hardware using FPGA or ASIC. In principle, tailoring hardware to neural networks should produce better platforms for running neural networks than general-purpose platforms (e.g., desktop computers). Unfortunately, this efficiency comes at the expense of flexibility; once hardware is designed and built it cannot be easily modified.

III. Example System for Neural Simulation

A. Example Computer System and Software Implementation

Various aspects of the present invention—such as a constant memory implementation of a phase-model neural network—can be implemented by software, firmware, hardware, or a combination thereof. FIG. 4 illustrates an example computer system 400 in which an embodiment of the present invention, or portions thereof, can be implemented as computer-readable code. Various embodiments of the invention are described in terms of this example computer system 400. After reading this description, it will become apparent to a person skilled in the relevant art how to implement the invention using other computer systems and/or computer architectures.

Computer system 400 includes one or more processors, such as processor 404. Processor 404 can be a special-purpose or a general-purpose processor. Processor 404 is connected to a communication infrastructure 406 (for example, a bus or network).

Computer system 400 includes a display interface 402. Display interface 402 is coupled to a display device 430 (such as, a liquid-crystal display, a cathode-ray tube display, a plasma screen display, or some other type of display).

Computer system 400 also includes a main memory 408, preferably random access memory (RAM), and may also include a secondary memory 410. Secondary memory 410 may include, for example, a hard disk drive 412 and/or a removable storage drive 414. Removable storage drive 414 may comprise a floppy disk drive, a magnetic tape drive, an optical disk drive, a flash memory, or the like. The removable storage drive 414 reads from and/or writes to a removable storage unit 418 in a well known manner. Removable storage unit 418 may comprise a floppy disk, magnetic tape, optical disk, etc. which is read by and written to by removable storage drive 414. As will be appreciated by persons skilled in the relevant art(s), removable storage unit 418 includes a computer-readable storage medium having stored therein computer software and/or data.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video-game devices), a removable memory chip (such as an EPROM, or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between computer system 400 and external devices. Communications interface 424 may include a modem, a network interface (e.g., an Ethernet card), a communications port, a PCMCIA slot and card, or the like. Software and data transferred via communications interface 424 are in the form of signals 428 which may be electronic, electromagnetic, optical, or other signals capable of being received by communications interface 424. These signals 428 are provided to communications interface 424 via a communications path 426. Communications path 426 carries signals 428 and may be implemented using wire or cable, fiber optics, a phone line, a cellular phone link, an RF link or other communications channels.

In this document, the terms "computer program medium" and "computer-readable storage medium" are used to generally refer to media, or other articles of manufacture, such as removable storage unit 418, removable storage unit 422, and a hard disk installed in hard disk drive 412. Computer-program medium and computer-readable storage medium can also refer to memories, such as main memory 408 and secondary memory 410, which can be memory semiconductors (e.g. DRAMs, etc.). These computer-program products are means for providing software to computer system 400.

Computer programs (also called computer control logic) are stored in main memory 408 and/or secondary memory 410. Computer programs may also be received via communications interface 424. Such computer programs, when executed, enable computer system 400 to implement embodiments of the present invention as discussed herein, such as neural simulations as described above. Accordingly, such computer programs represent controllers of the computer system 400. Where embodiments of the invention are implemented using software, the software may be stored in a computer program product and loaded into computer system 400 using removable storage drive 414, interface 420, hard drive 412 or communications interface 424.

B. Configuration of Computer System for Neural Simulations

FIG. 5 illustrates an example system 500 for implementing a neural simulation in accordance with an embodiment of the present invention. Referring to FIG. 5, system 500 includes a general-purpose computer 504, a remote device (display) 506, a secondary memory 510, and a data-parallel processing unit 508.

General-purpose computer 504 performs input/output functions of system 500. To perform these functions, general-purpose computer 504 comprises typical components of a general-purpose computer—such as, for example, a memory and general-purpose processor. General-purpose computer 504 is coupled to remote device (display) 506, data-parallel processing unit 508, and secondary memory 510. An input signal 502 (e.g., a video signal, audio signal, or some other input signal) is provided to general-purpose computer 504.

Remote device (display) 506 enables an administrator to interact with system 500. Remote device 506 may simply comprise a monitor and keyboard to enable a user to interact with general-purpose computer 504. Alternatively, remote device 506 may comprise a computing device (e.g., laptop computer, desktop computer, hand-held device, or the like) that is coupled to general-purpose computer 504 via a network connection (e.g., a local area network (LAN) connection, an Internet connection, or the like). Remote device 506 may be used by an administrator to set up a neural simulation. For example, the administrator may provide a network-description file or other inputs as described in more detail below. Additionally, remote device 506 enables an administrator to monitor the progress of a neural simulation that may run on system 500. For example, if input signal 502 is a video signal, general-purpose computer 504 may cause input signal 502 to be displayed on remote device 506 to enable an administrator to evaluate whether system 500 is properly functioning to identify entities (e.g., objects) included in the video signal. As another example, if input signal 502 is an audio signal, general-purpose computer 504 may cause input signal 502 to be played on remote device 506 to enable an administrator to evaluate whether system 500 is properly functioning to identify entities (e.g., sound sources) included in audio signal.

Secondary memory 510 stores algorithms (e.g., neural simulations) to be executed by system 500 and also stores instances of simulated neural (which may be stored as memory arrays). Secondary memory 510 may comprise, for example, a hard disk drive or a removable storage drive (e.g., floppy disk drive, magnetic tape drive, an optical disk drive, a flash drive, etc.).

Data-parallel processing unit 508 performs computations to implement a neural simulation in accordance with an embodiment of the present invention. In an embodiment, data-parallel processing unit 508 comprises one or more off-the-shelf graphics processing units (GPUs)—such as, in an exemplary non-limiting embodiment, three general-purpose GPUs provided by NVIDIA Corporation of Santa Clara, Calif. ("NVIDIA"). In another embodiment, data-parallel processing unit 508 comprises one or more custom-made processing units, specifically configured to process neural-simulation data.

Data-parallel processing unit 508 is connected to general-purpose computer 504. The connection between data-parallel processing unit 508 and general-purpose computer 504 may comprise a peripheral component interconnect (PCI), a PCI express (PCIe), or some other type of connection. Data-parallel processing unit 508 communicates with general-purpose computer 504 via an application-programming interface (API). The API allows an administrator to program data-parallel processing unit 508 to perform functions of a neural simulation in accordance with an embodiment of the present invention. If data-parallel processing unit 508 comprises a custom-made processing unit, then a custom-made API is used. If, on the other hand, data-parallel processing unit 508 comprises one or more off-the-shelf GPUs, then either a custom-made or commercially available API can be used. Several types of commercially available APIs for programming off-the-shelf GPUs currently exist—including, in an exemplary non-limiting embodiment, DirectX® developed by Microsoft Corporation of Redmond, Wash.; OpenGL® developed by Silicon Graphics, Inc. of Sunnyvale, Calif.; and Compute Unified Device Architecture (CUDA) developed by NVIDIA. For commercially available APIs, the API typically communicates with a driver. The driver translates standard code received from the API into a native format of instructions understood by the off-the-shelf GPU. The driver is typically written by the manufacturer of the off-the-shelf GPU. The GPU then executes the instructions from the driver.

IV. Example Operation of Neural Simulation

FIG. 6 illustrates steps of an example neural simulation 600 performed by a phase-model neural network in accordance with an embodiment of the present invention. Neural simulation 600 may be implemented, for example, on the hardware components of system 500 of FIG. 5 as explained in greater detail below.

Referring to FIG. 6, neural simulation 600 begins at a step 602 in which a main function is called. The algorithm used to implement neural simulation 600 may be stored, for example, in secondary memory 510 of system 500. Calling the main function, as illustrated in step 602, may load this algorithm (or a portion thereof) into the local memory of general-purpose computer 504 in preparation for the execution of neural simulation 600.

In a step 604, neural simulation 600 is initialized based on groups and projections defined in a network-description file 606. A group defines a collection of simulated neurons. A projection defines how simulated neurons are to be connected.

Table 1 illustrates a portion of a network-description file that defines a neural group, labeled "V2 Groups."

TABLE 1

| Name V2 Groups | Height | Width | Firing Threshold | Phase Threshold | Voltage Dependent Threshold | Persistence |
|---|---|---|---|---|---|---|
| V2_Color0 | 60 | 80 | 0 | 0.9 | 0.02 | 0 |
| V2_Color1 | 60 | 80 | 0 | 0.9 | 0.02 | 0 |
| V2_Color2 | 60 | 80 | 0 | 0.9 | 0.02 | 0 |
| V2_Color3 | 60 | 80 | 0 | 0.9 | 0.02 | 0 |
| V2_Color4 | 60 | 80 | 0 | 0.9 | 0.02 | 0 |
| V2_Color5 | 60 | 80 | 0 | 0.9 | 0.02 | 0 |
| V2_Color6 | 60 | 80 | 0 | 0.9 | 0.02 | 0 |
| V2_Color7 | 60 | 80 | 0 | 0.9 | 0.02 | 0 |
| V2_Color8 | 60 | 80 | 0 | 0.9 | 0.02 | 0 |
| V2_Color9 | 60 | 80 | 0 | 0.9 | 0.02 | 0 |
| V2_Color0_I | 1 | 1 | 0.5 | 0 | 0 | 0 |
| V2_Color1_I | 1 | 1 | 0.5 | 0 | 0 | 0 |
| V2_Color2_I | 1 | 1 | 0.5 | 0 | 0 | 0 |
| V2_Color3_I | 1 | 1 | 0.5 | 0 | 0 | 0 |

TABLE 1-continued

| Name<br>V2 Groups | Height | Width | Firing<br>Threshold | Phase<br>Threshold | Voltage Dependent<br>Threshold | Persistence |
|---|---|---|---|---|---|---|
| V2_Color4_I | 1 | 1 | 0.5 | 0 | 0 | 0 |
| V2_Color5_I | 1 | 1 | 0.5 | 0 | 0 | 0 |
| V2_Color6_I | 1 | 1 | 0.5 | 0 | 0 | 0 |
| V2_Color7_I | 1 | 1 | 0.5 | 0 | 0 | 0 |
| V2_Color8_I | 1 | 1 | 0.5 | 0 | 0 | 0 |
| V2_Color9_I | 1 | 1 | 0.5 | 0 | 0 | 0 |

Network-description file 606 specifies features of each group of simulated neurons. These features are implemented during the initialization of step 606. As illustrated in Table 1, network-description file 606 may specify, for example, the following features of each group:

Height—the number of simulated neurons included in the neural group along a first (e.g., vertical) dimension;

Width—the number of simulated neurons included in the neural group along a second (e.g., horizontal) dimension;

Firing threshold—an overall activity level that must be received by a simulated neuron in order to cause the simulated neuron to become active;

Phase threshold—an activity level that must be received by a simulated neuron in order to cause the simulated neuron to choose a phase; otherwise, the phase is set randomly;

Voltage-dependent threshold—an activity level that must be collectively provided by all voltage-independent inputs to a simulated neuron in order for voltage-dependent inputs to contribute to the activity of the simulated neuron; and Persistence—a duration over which a simulated neuron remains active.

It is to be appreciated that these features are presented for illustrative purpose only, and not limitation. Other features of a neural group may be specified in network-description file 606.

In addition to neural groups, network-description file 606 specifies projections between neural groups. The projections define how the simulated neurons of the different neural groups will connect to each other during the initialization of step 604. Table 2 illustrates a portion of a network-description file that defines connections between simulated neurons of different neural groups. As illustrated in Table 2, network-description file 606 may specify, for example, the following features of each projection:

from neural group—the simulated group of neurons from which a connection emanates;

to neural group—the simulated group of neurons to which a connection is made;

probability—the probability that a connection will be created between a from neuron and a to neuron during initialization;

influence—a weighting factor for a particular connection;

maximum initial weight—the maximum initial weight between a from neuron and a to neuron;

minimum initial weight—the minimum initial weight between a from neuron to a to neuron;

connection type—the type of connection (e.g., voltage-dependent or voltage-independent) between a from neuron and a to neuron;

phase-dependent—the phase-dependency of a connection (e.g., phase-independent or phase-dependent)

learning rule—the transfer function between a from neuron and a to neuron; and learning rate—a parameter that governs how quickly a connection strength between a from neuron and a to neuron can change over time.

It is to be appreciated that the features of neural projections presented in Table 2 are presented for illustrative purposes only, and not limitation. Other features of neural projections may be included in network-description file 606.

TABLE 2

| From | To | Probability | Maximum<br>Initial<br>Weights | Connection<br>Type | Learning<br>Rule | Learning<br>Rate |
|---|---|---|---|---|---|---|
| V1 -> V2 | | | | | | |
| Ver | V2_Ver | 0.5 | 2.5 | 0 | 0 | 0 |
| Hor | V2_Hor | 0.5 | 2.5 | 0 | 0 | 0 |
| Pos | V2_Pos | 0.5 | 2.5 | 0 | 0 | 0 |
| Neg | V2_Neg | 0.5 | 2.5 | 0 | 0 | 0 |
| V1 -> V2 Inhibition | | | | | | |
| Ver | V2_Ver_I | 0.1 | 1 | 0 | 0 | 0 |
| Hor | V2_Hor_I | 0.1 | 1 | 0 | 0 | 0 |
| Pos | V2_Pos_I | 0.1 | 1 | 0 | 0 | 0 |
| Neg | V2_Neg_I | 0.1 | 1 | 0 | 0 | 0 |
| V2_Ver_I | V2_Ver | 1 | −1 | 0 | 0 | 0 |
| V2_Hor_I | V2_Hor | 1 | −1 | 0 | 0 | 0 |
| V2_Pos_I | V2_Pos | 1 | −1 | 0 | 0 | 0 |
| V2_Neg_I | V2_Neg | 1 | −1 | 0 | 0 | 0 |

Referring again to FIG. 6, after the initialization step 604 is performed, inputs to simulation 600 are obtained, as illustrated in a step 608. The inputs refer to the activity and phase of each simulated neuron used in a neural simulation. Initially, the activity and phase of simulated neurons is set based on an input signal. In an embodiment, the I/O functions required to get the inputs of step 608 are performed by general-purpose computer 504. For example, get-inputs step 608 may be performed by general-purpose computer 504 when it receives an input signal and provides the input signal to data-parallel processing unit 508.

In a step 610, neural updates are computed. That is, a new activity and phase are computed for each simulated neuron. The new activity and phase of a first simulated neuron is based on the activities and phases of other simulated neurons connected to the first simulated neuron, as described above. In an embodiment, the neural updates of step 610 are computed by data-parallel processing unit 508.

In a step 612, results of the neural updates are obtained. For example, general-purpose computer 504 may obtain the results of the neural updates performed by data-parallel processing unit 508 during step 610.

After step 612, neural simulation 600 may loop back to step 608. In accordance with an embodiment of the present invention, steps 608, 610, and 612 represent one simulation cycle of neural simulation 600.

V. Fixed-Memory Implementation

A. Limitations of Existing Implementation of Phase Model

In an embodiment, given the success of the phase model, it is desirable to develop custom hardware to efficiently implement the phase model. Unfortunately, the process for generating the new phase by sampling P(i) presents a challenge to developing custom hardware. Conventional implementations (see, e.g., Seth et al.) require a memory of a size that grows linearly with the number of phases in order to store the unnormalized distribution p(i). That is, the amount of memory increases linearly with the number of phases $N_\phi$. Conventional implementations compute p(i) for i=0, 1, ... $N_\phi$−1 by storing each value in a memory buffer. Once all $N_\phi$ values are computed, the normalized probability distribution P(i) is computed and then sampled.

Implementing such a conventional algorithm in a FPGA or ASIC requires a buffer of size $N_\phi$. This requirement is an undesirable feature of the algorithm. First, the only way to make the number of phases large is to use precious resources (i.e., dedicate a large percentage of the hardware resources) to encoding this buffer. Increasing the number of phases is advantageous because it increases the capacity of the network (i.e., increases the number of objects the network can encode). Conventional implementations tie the capacity of the network to the hardware in an undesirable way. A second disadvantage is that on a dedicated hardware platform creating an adjustable size buffer is problematic. Thus, most designs for a FPGA or ASIC would either use a fixed buffer size or at the very least put some maximum value on the number of phases $N_\phi$.

Unlike conventional approaches, an embodiment of the present invention provides an implementation that requires only a fixed amount of memory to implement regardless of the number of phases $N_\phi$. To use only a fixed amount of memory, embodiments of the present invention sequentially compute and sample p(i). Consequently, neural-network implementations in accordance with embodiments of the present invention are better suited for custom hardware implementations.

B. Sequential Sampling of a Probability Distribution

An embodiment of the present invention provides a method for sampling a probability distribution using a fixed amount of memory. The input in this case is a sequence of numbers, p(i) satisfying the following conditions:

$$p(\varphi = k) \geq 0 \ \forall k$$

$$\sum_{k=0}^{N_\varphi - 1} p(\varphi = k) > 0$$

The output of this method is a phase, $\phi$, that is a sample drawn from the probability distribution $$P(\varphi = k) = \frac{p(\varphi = k)}{\sum_{l=0}^{N_\varphi - 1} p(\varphi = l)} \text{ for } k = 0, 1, \ldots N_\varphi - 1.$$

Example pseudo-code for sequentially sampling the distribution, P(i), is shown below:

```
Input: p(φ = k) for k =0,1, ... N_φ − 1.
Output: φ~P(φ)
T=0
#Find the smallest k for which p(φ = k) > 0
k_start = 0
While p(φ = k_start)== 0 {
    k_start = k_start + 1 ;
}
For k = k_start, k_start + 1,..., N_φ − 1. {
    T = T + p(φ = k)
    ρ = random number on the interval (0,1]
    δ_k = p(φ = k)
          ─────────
               T
    If { ρ·T ≦ δ_k } {
        φ = k
    }
}
```

The output of the above-listed pseudo-code is a new phase, $\phi$, that is a random variable with distribution P($\phi$). Note that the symbol "#" in the above pseudo-code indicates that the text following the "#" is a comment.

In this section, it is proven that using the above-listed pseudo-code to pick phase, $\phi$, is equivalent to sampling the distribution P($\phi$=k).

Let h($\phi$) be the distribution on $\phi_j$ produced by sampling $\phi_j$ using the algorithm above. As stated earlier, P($\phi$) is the distribution from which we want to sample $\phi_j$ and is produced by normalizing p($\phi$). So, it must be proven that $$h(\phi=k) = P(\phi=k) \text{ for } k=0,1,\ldots,N_\phi-1.$$

To prove the probability distributions are equal, it is sufficient to prove that the cumulative distributions are equal:

$$H(\phi \leq k) = \overline{P}(\phi \leq k) \text{ for } k=0,1,\ldots,N_\phi-1$$

where H and $\overline{P}$ are given as follows:

$$H(\varphi \leq k) = \sum_{l=0}^{l=k} h(\varphi = l)$$

$$\overline{P}(\varphi \leq k) = \sum_{l=0}^{l=k} P(\varphi = l)$$

By definition, the true cumulative distribution is $$\overline{P}(\varphi \le k) = \frac{\sum_{l=0}^{k} P(\varphi = l)}{\sum_{l=0}^{N_\varphi - 1} P(\varphi = l)}$$

The cumulative distribution $H(\phi \le k)$ can be computed easily. The phase $\phi$ is sampled by iterating from $i=0, 1, \ldots, N_\phi - 1$. At each step, the probability that $\phi = i$ is set is given by $$\delta_i = \frac{p(\varphi = i)}{\sum_{m=0}^{i} p(\varphi = m)}$$

Thus, the only way $\phi \le k$ is if for $i = k+1, \ldots, N_\phi - 1$, we never set $\phi = i$. The probability that this happens is $$H(\varphi \le k) = \prod_{m=k+1}^{N\varphi - 1} (1 - \delta_m)$$

$$= \prod_{m=k+1}^{N\varphi - 1} \frac{\sum_{n=0}^{m-1} p(\varphi = n)}{\sum_{n=0}^{m} p(\varphi = n)}$$

$$= \frac{\sum_{n=0}^{k} p(\varphi = n)}{\sum_{n=0}^{k+1} p(\varphi = n)} \cdot \frac{\sum_{n=0}^{k+1} p(\varphi = n)}{\sum_{n=0}^{k+2} p(\varphi = n)} \cdot \ldots \cdot \frac{\sum_{n=0}^{N\varphi - 2} p(\varphi = n)}{\sum_{n=0}^{N\varphi - 1} p(\varphi = n)}$$

$$= \frac{\sum_{n=0}^{k} p(\varphi = n)}{\sum_{n=0}^{N\varphi - 1} p(\varphi = n)}$$

The method described above for sequentially sampling a probability distribution can be used to implement a network of phase neurons using constant memory. To do so, the function $f_j$ is looped over all possible phases as indicated below:

```
Function f_j
T = 0
For i = 0, 1, ..., N_φ - 1
    p(i) = pgen_j(i, r̄_j, {afunc(r̄_l, w̄_m) : (l, j, m) ∈ C^j})
    if p(i) > 0
        T = T + p(φ = i)
        ρ = random number on the interval (0,1]
        δ_k = p(φ = i) / T
        If { ρ·T ≤ δ_k } {
            φ_j = k
        A_j ← h_j(A_j, φ_j, {afunc(r̄_l, w̄_m) : (l, j, m) ∈ C^j})
Return r̄_j = { A_j
                φ_j }
```

The computation of $h_j$ implies a loop over all incoming connections to post-synaptic neuron j. Similarly, $pgen_j$ implies a loop over all incoming connections. In practice, these two functions are often combined so that there is a single loop over the incoming connections. To do this $pgen_j$, which is used to compute the unnormalized probability distribution, is replaced with a function, sfun, that evaluates $pgen_j$ and $A_j$ (using $h_j$ with $\psi_{j=i}$) and outputs an ordered pair $(p(i), \overline{A}_j)$ where p(i) is computed according to pgen and $\overline{A}_j$ is computed according to $h_j$. When the if condition is satisfied, $A_j$ is updated in addition to the phase.

```
Function f_j
T = 0
A_j = 0
For i = 0, 1, ..., N_φ - 1
    (p(i), Ā_j) = sfun_j(i, r̄_j, {afunc(r̄_l, w̄_m) : (l, j, m) ∈ C^j})
    if p(i) > 0
        T = T + p(φ = i)
        ρ = random number on the interval (0,1]
        δ_k = p(φ = i) / T
        If { ρ·T ≤ δ_k } {
            φ_j = k
            A_j ← Ā_j
Return r̄_j = { A_j
                φ_j }
```

As a result of this algorithm, the activity and phase are updated together in a fixed memory. FIG. 7 illustrates an exemplary non-limiting method 700 for implementing a phase-model neural network that requires only a fixed amount of memory. Method 700 begins at a step 702 in which a normalization variable (e.g., T in the above-listed pseudo-code) is initialized (e.g., set to zero). In a step 704, a phase variable (e.g., k) is initialized (e.g., set to zero). In a step 706, an unnormalized variable (e.g., p) is updated. In the above-listed pseudo-code, for example, the unnormalized variable is updated based on the function $pgen_j$. In a step 708, a normalization variable (e.g., T) is updated based on the unnormalized variable. For example, in the above-listed pseudo-code, the new value of T is set equal to the old value of T plus the unnormalized variable, p.

In a step 710, it is determined whether the unnormalized variable is greater than or equal to a (pseudo) randomly selected number on the unit interval. In the above-listed pseudo-code, for example, it is determined whether $\rho \cdot T \le \delta_k$. If, on the one hand, it is determined that the unnormalized variable is NOT greater than or equal to the (pseudo) randomly selected number, then no action is taken, as indicated in a step 712. If, on the other hand, it is determined that the unnormalized variable is greater than or equal to the (pseudo) randomly selected number, then the phase (e.g., $\phi$) is set equal to the phase variable (e.g., k), as indicated in a step 714.

Regardless of the outcome of the determining step 710, it is determined in a step 716 whether the phase variable is equal to the number of phases minus one (e.g., $N_\phi - 1$) in the phase model being implemented. If, on the one hand, it is determined that the phase variable is NOT equal to the number of phases minus one, then the phase variable is incremented as indicated in a step 718, and then method 700 returns to step 706. If, on the other hand, it is determined in step 716 that the phase variable is equal to the number of phases minus one, then the phase variable is provided as output, as indicated in a step 720.

VI. Conclusion

Described above is a general algorithm for implementing probabilistic neural networks using constant memory and applications thereof. It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A method for implementing a phase-model neural network, the phase-model neural network comprising a plurality of neurons, with individual ones of the plurality of neurons being associated with an activity level and a phase of firing, the method comprising:

obtaining a probability distribution of phases;

normalizing the probability distribution based on a predetermined number of phases used in the phase-model neural network; and sequentially sampling the normalized probability distribution of phases, based on a comparison with a threshold value and either a random number and/or a pseudo-random number, using no more than a fixed amount of memory to store the probability distribution of phases, regardless of the predetermined number of phases used in the phase-model neural network;

updating individual ones of the plurality of neurons based on the sequentially sampled phases.

* * * * *